June 10, 1958
L. V. HAGGADONE
2,837,911
WHEEL FRICTION INDICATOR
Filed Aug. 8, 1955
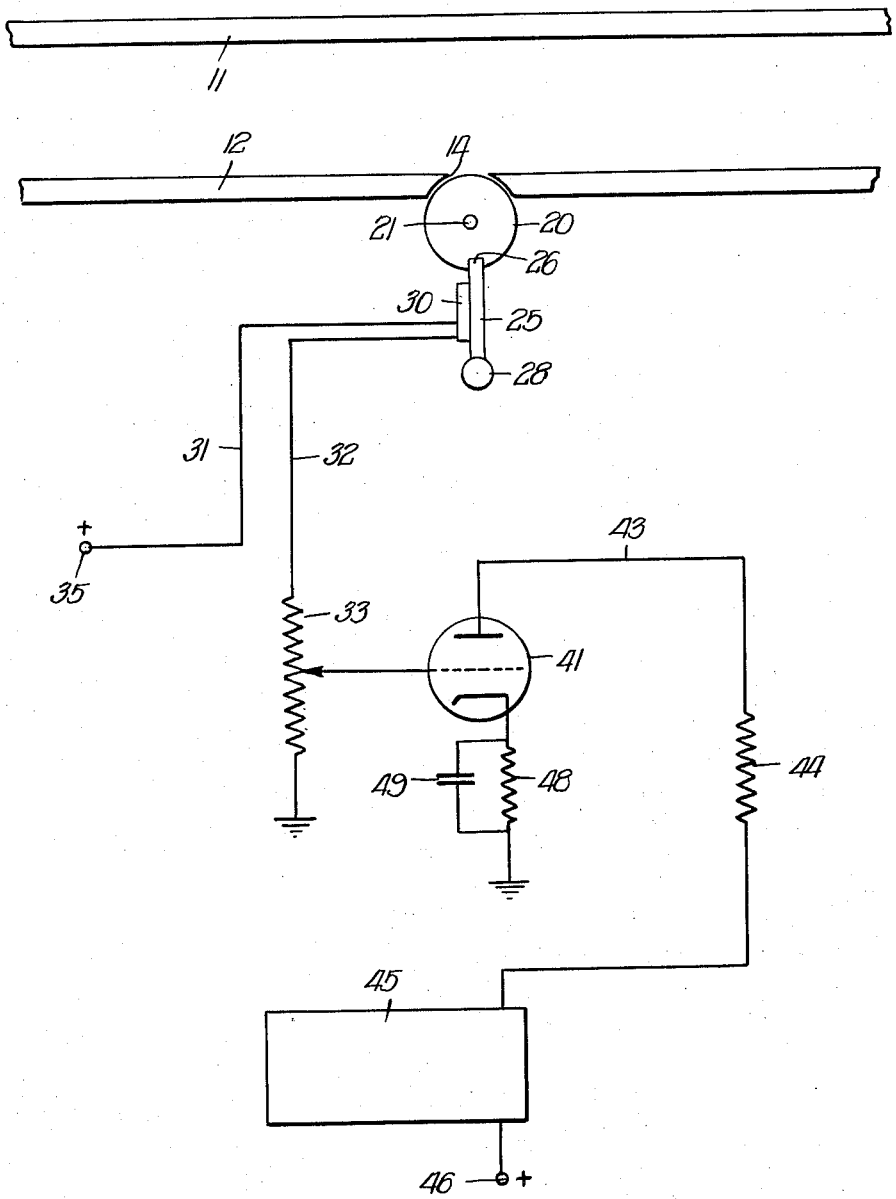
INVENTOR.
L. V. Haggadone,
BY

United States Patent Office 2,837,911
Patented June 10, 1958

2,837,911
WHEEL FRICTION INDICATOR

L. V. Haggadone, Chicago, Ill., assignor of fifty-one percent to Hardt Foundation, Chicago, Ill., a corporation of Illinois Application August 8, 1955, Serial No. 526,827

5 Claims. (Cl. 73—9)

This invention relates to a device for measuring the friction characteristics of a railway car wheel, and more particularly to a mechanism for visually indicating the actual frictional resistance of a railway car wheel on a rail.

It is an object of the invention to provide a device which may be used to show which wheels in a train require attention.

It is another object of the invention to provide a device which will indicate the operating characteristics of railway car wheels before the train has reached a station.

Further objects and advantages of this invention will become evident as the description proceeds and from an examination of the accompanying drawing which illustrates one embodiment of the invention.

In the drawings:

The figure is a top plan view of a device embodying the invention, illustrating schematically the electrical circuits.

Referring now to the drawing, there is shown in plan view a pair of tracks 11, 12. In track 12 a portion has been removed at 14. A metal contact block 20 is mounted in the removed section adapted to be contacted and engaged by a railway car wheel on track 12. The contact block has a cylindrical shape, with one radial face presenting an upper surface to fill in partially the removed portion at 14. As shown in the drawing, only a sector of the contact block is disposed within the outline of track 12.

The contact block is pivotally mounted for rotation on roller bearings about a vertical axis 21. It will be seen that as a railway car wheel passes over the contact block the car wheel tends to rotate it by a force in the direction of the movement of the car and in an amount depending upon the friction characteristics of the car wheel.

A spring 25 limits the rotation of the contact block. The spring is in the form of a steel bar which is fastened at one end to the block at 26, at a point on the radius of the block perpendicular to the track 12. The steel bar 25 is fastened at its other end to an anchor post 28. As the railway car wheel passes over track 12, the contact block is rotated a certain amount. This tends to bend the spring steel bar 25.

Mounted on the spring steel bar is a strain gauge 30 which is connected in series in the grid circuit of an electronic tube of an amplifying system. A wire 31 leads from one terminal of the strain gauge to the positive terminal 35 of a direct current source. Lead 32 is connected from the other terminal of the strain gauge to a potentiometer 33. As the spring bar 25 bends by the partial movement of the contact block, the strain gauge varies an electrical current in a circuit which is amplified and visually reproduced.

The amplifying circuit shown uses a triode tube 41. A Brush recorder 45 is connected in series with the plate circuit 43 of the triode. One terminal of the recorder is connected to the plate of the triode through a limiting resistor 44 and the other to the positive terminal 46. A cathode bias resistor 48 is connected in series with the cathode, having a by-pass condenser 49 in parallel to obtain a required negative voltage on the grid.

The Brush recorder accepts the variations in voltage in the plate circuit 43 of the triode and converts them into visual lines on paper. The visual lines may be used to determine the operating characteristics of each wheel of a train. A dual pen Brush recorder may be used if two sides of a train are to be inspected simultaneously.

From the foregoing the operation of the device should be apparent. As a railway car wheel is rolled it exerts a force on the track in the direction of its movement. If the load on the wheel is increased this force is also increased. Also, if the coefficient of friction of the wheel journal becomes greater this force also becomes greater. Significantly, a change in the coefficient of friction of the wheel journal causes a much larger change in this force than changes in the load. As a railway car wheel rolls over the contact block 20 the frictional resistance of the wheel on the rail will tend to cause a rotation of block 20 about vertical axis 21, due to this force just described. A railway car wheel with normal operating characteristics will cause very little frictional resistance on the rail tending to rotate the contact block when the wheel passes thereover. As the frictional resistance increases the tendency to rotate the contact block increases in direct proportion. The force causing the tendency of the contact block to rotate can be used to indicate the conditions under which the wheel is operating and thus where lubrication is needed.

Any movement of the contact block tends to bend the spring bar 25. The deflection of the spring bar is used to vary the current in the grid circuit of the triode 41, or other type of amplifier. The variations in the current in the grid circuit are amplified by the triode and visually recorded by the Brush recorder.

In actual practice the contact block 20 may be placed any convenient distance from a station. The Brush recorder is mounted at the station so that all the conditions of the journals can be determined before the train arrives. In this way maintenance may be advised in advance as to specific wheels having faulty operation and which require attention.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. A device for the measurement of the operating characteristics of a railway car wheel which comprises a contact member located in a section of track and to be engaged by a railway car wheel passing thereover to move said contact member by the frictional resistance of said wheel, an electrical circuit, means connected to said contact member for varying an electrical current in said circuit, and indicating means connected to said electrical circuit for showing such current variations.

2. A device for the measurement of the operating characteristics of a railway car wheel which comprises a contact member located in a section of track and to be engaged and moved by the frictional resistance of a railway car wheel passing thereover, a strain gauge for varying an electrical current as said contact member is moved, and indicating means responsive to the variations in the electrical current for showing the operating characteristics of a railway car wheel passing over said contact member.

3. A device for the measurement of the operating characteristics of a railway car wheel which comprises a contact member located in a section of track and to be engaged and moved by the frictional resistance of a railway car wheel passing thereover, a spring member connected to said contact member, means connected to said spring member for varying an electrical current, and indicating means responsive to variations in the electrical current, for showing the operating characteristics of a railway car wheel.

4. A device for the measurement of the operating characteristics of a railway car wheel which comprises a contact member located in a section of track, and to be engaged and moved by a railway car wheel passing thereover, means for varying an electrical current in response to movements of said contact member, means for amplifying said electrical current variations, and indicating means for showing said current variations.

5. A device for the measurement of the operating characteristics of a railway car wheel which comprises a contact member located in a section of track and to be engaged and moved by the frictional resistance of a railway car wheel passing thereover, said contact member pivotally mounted for a partial rotation about its axis, a bar spring member connected at one end to said contact member, said bar being deflected upon rotation of said contact member, means for varying an electrical current in response to deflection of said bar, and indicating means responsive to said current variations for showing the operating characteristics of a railway car wheel.

References Cited in the file of this patent

UNITED STATES PATENTS

| | | |
|---|---|---|
| 2,408,553 | Gieskieng et al. | Oct. 1, 1946 |
| 2,471,423 | Gisser | May 31, 1949 |
| 2,496,405 | Foufounis | Feb. 7, 1950 |
| 2,690,668 | Lucas | Oct. 5, 1954 |
| 2,779,583 | Bone | Jan. 29, 1957 |